United States Patent [19]

Cattanach et al.

[11] Patent Number: 4,613,393
[45] Date of Patent: Sep. 23, 1986

[54] METHOD FOR FORMING REINFORCED THERMOPLASTIC COMPOSITES

[75] Inventors: James B. Cattanach, Middlesbrough; Anthony E. Jones, Hitchin, both of England

[73] Assignee: Imperial Chemical Industries PLC, London, England

[21] Appl. No.: 664,691

[22] Filed: Oct. 25, 1984

[30] Foreign Application Priority Data

Nov. 7, 1983 [GB] United Kingdom ............... 8329664

[51] Int. Cl.$^4$ ............................................. B32B 31/12
[52] U.S. Cl. .................................... 156/323; 156/155; 156/344
[58] Field of Search ..................... 156/242, 323, 583.3, 156/344, 155

[56] References Cited

U.S. PATENT DOCUMENTS 3,533,352 10/1970 Miller ........................... 156/583.3 X
3,939,024 2/1976 Hoggatt .............................. 156/242
4,372,800 2/1983 Oizumi et al. ................... 156/323 X Primary Examiner—Robert A. Dawson
Attorney, Agent, or Firm—Cushman, Darby & Cushman

[57] ABSTRACT

A method of improving the surface finish of a fibre-reinforced thermoplastic article in which the fibres are present as superimposed layers of continuous, aligned fibres comprising pressing the layers at a temperature above the softening point of the thermoplastic of the article characterized in that the pressure is transmitted to the superimposed layers through a resilient member and that a metal foil having a thickness of between 0.05 and 0.5 mm, preferably between 0.075 and 0.25 mm, is present between the resilient member and the reinforced article to be pressed.

9 Claims, No Drawings

METHOD FOR FORMING REINFORCED THERMOPLASTIC COMPOSITES

This invention relates to fibre-reinforced thermoplastic composite articles of good surface finish and to methods for producing such articles.

There is a strong interest in utilising fibre reinforced thermoplastic compositions in structural applications as replacements for metals because of advantages such as weight saving. This is particularly true in the aircraft and aerospace industries. To meet this need fibre reinforced polymer composites have been under development in which continuous, aligned fibres have been present in the composite. Because of the difficulty of preparing composites in which the fibres are well wetted by the polymer these composites, until recently, were composed of thermosetting polymers. The precursors for these thermosetting polymers are of low viscosity and can wet the reinforcing fibre thoroughly prior to being cured to the polymeric form. Recently, thermoplastic polymer composites having a high volume content of continuous, aligned fibres have been prepared in a manner which permits good fibre wetting. These are disclosed in European patent application No. 56703.

The products described in European Patent Publication No. 56703 are normally obtained as a thin prepreg which for many applications needs to be converted to a thicker sheet. This is achieved by laying up layers of the prepreg with the fibres disposed in chosen directions, in planes through the layers, and pressing the assembly at elevated temperatures to form a consolidated sheet. The prepreg material may, if desired, be woven prior to consolidation.

Other processes of producing thermoplastic polymer composite sheets having continuous, aligned fibres disposed therein are known. For example, British Patent Specification No. 1 570 000 discloses thermoplastic composites which are produced by stacking, alternately, layers of a thermoplastics material and layers of reinforcing fibres which have been impregnated with a second thermoplastic dissolved in a solvent. The stack is placed in a press and subjected to heat and pressure to consolidate the layers.

The fact that the matrix polymer is a thermoplastic polymer gives such composites an advantage over thermoset composites because these thermoplastic composites are inherently thermoformable and can be repeatedly thermoformed if necessary. However, the nature of the continuous, aligned fibres in these composites makes them difficult to thermoform into articles having a good surface finish. This difficulty is increased to some extent when the thermoplastic matrix is an aromatic polymer of high softening point.

For example, the products described in European Patent Publication No. 56703 are normally obtained as a thin prepreg which for many applications needs to be converted to a thicker sheet. This is achieved by laying up layers of the prepreg with the fibres disposed in chosen directions, in planes through the layers, and pressing the assembly at elevated temperatures to form a consolidated sheet. The prepreg material may, if desired, be woven prior to consolidation. Although good consolidation of the layers can be achieved, articles shaped from these consolidated sheets leave something to be desired in terms of surface finish even though the sheets have been subjected to further heating and compression steps. Thus one of the best methods for thermoforming such products is the hydroforming process, used conventionally for forming metals. In this process forming pressure is transmitted through a resilient membrane by a fluid medium. Although the use of such a process enables sheet material to be formed the surface quality of the shaping still requires improvement, deficiencies being apparent as surface roughness or as area in which the fibre reinforcement is exposed at the surface of the shaping. A method has now been devised which enables the surface finish of articles thermoformed from highly reinforced thermoplastic composite materials to be improved. In particular, improvements can be obtained where the thermoplastic is an aromatic polymer of high softening point.

According to the invention there is provided a method of improving the surface finish of a fibre-reinforced thermoplastic article in which the fibres are present as superimposed layers of continuous, aligned fibres, optionally woven, comprising pressing the layers at a temperature above the softening point of the thermoplastic of the article characterised in that the pressure is transmitted to the superimposed layers through a resilient member and that a metal foil having a thickness of between 0.05 and 0.5 mm, preferably between 0.075 and 0.25 mm, is present between the resilient member and the reinforced article to be pressed. An improved surface finish is obtained at surprisingly low pressures of, for example, 10 bar, with excellent results at 20 bar and above. Although pressures as high as 1000 bar may be used there is generally little additional advantage to be gained in using pressures in excess of 200 bar.

Although the workpiece to be pressed can be heated to the required pressing temperature in the press it is more convenient to heat the workpiece to a required temperature externally of the press using an oven and then to transfer the heated workpiece to the press within a time in which the workpiece is still at or above the required pressing temperature. The metal foil interlayer may be at ambient temperature when located in the press or it may have been heated to an elevated temperature, preferably still below the softening point of the thermoplastic to be pressed.

The process of the invention gives rise to an article having a surface which is improved in respect of smoothness and the avoidance of fibres which are proud of the surface. The surface is not necessarily glossy but usually has a dull gloss. It has been previously found to be difficult to prepare articles of high fibre content which are substantially free of surface blemishes such as dull patches caused by fibres being exposed at the surface of the article. The present invention allows the production of an article in which the fibres are not exposed at the surface and the surface appears to be uniformly smooth. The surfaces are visually attractive and in most cases do not require further surface finishing processes in order to be visually acceptable.

Although it is not known why the presence of the metal foil results in such a marked improvement compared with the use of, for example the use of a resilient membrane in a hydroforming process it is believed that the thermal properties of the foil aid the crystallisation of the surface layers of the matrix polymer in those cases where a crystallisable polymer is used as the matrix polymer in the reinforced thermoplastic.

The metal foil may be of any metal having a melting point in excess of the temperatures at which the pressing operation is performed. Suitable metals are aluminium, stainless steel or brass. Preferably the metal foil should have a polished surface to reduce adhesion between the foil and the composite as far as possible. The polished surface may be an impressed patterned surface. Such a surface could be decorative. Alternatively it could be functional, for example to provide a rough surface of the type which is desirable to improve the interface locking via an adhesive where surfaces are to be bonded together. For adhesive applications the rough surface should be clean, and this may be achieved by pressing an aluminium foil against the work piece without the commonly used surface release agent, and subsequently dissolving the foil with NaOH.

The pressing operation may be performed using any of the processes known to those skilled in the art provided that the pressure is transmitted through a resilient member, such as is used in hydroforming. If the pressure is transmitted to the article using the metal foil but in the absence of the resilient member a much poorer surface quality is achieved.

The process may be applied in any situation in which fibre-reinforced prepreg material is subjected to a pressing operation at a temperature in excess of the softening temperature of the thermoplastic matrix. Thus in a process in which thin prepreg material, such as produced according to the process of European Patent Publication No. 56703, is to be consolidated into a thicker sheet, layers of prepreg may be laid up with the uni-directional fibres of the prepreg disposed in any chosen direction and the process of the present invention applied as part of the consolidation process to produce flat sheet of better surface quality than that produced using conventional metal platens. The process may also be used to join several sheets of consolidated prepreg layers or may be used to joint a polymer film to a consolidated sheet.

The process is not limited to the pressing of flat sheets and may be employed to advantage for producing shaped articles from prepreg or sheets using conventional shaping process adapted so that the pressure is transmitted through a resilient member and a metal foil contacting the fibre-reinforced material.

The present invention may also be employed in the process described in copending British patent application No. 8329663, filed on even date herewith in which a heat-softened sheet of fibre-reinforced thermoplastic, in which the fibres are present as superimposed layers of continuous, aligned fibres, is shaped on a male tool by biassing the sheet to conform to the shape of the tool by progressively urging the sheet from the area contacting the tool towards the extremities of the sheet. The process of the present invention can be used in this shaping process by interposing a metal foil between the softened sheet and the biassing means and using resilient, rubber-coated rolls to roll the sheet onto the male tool.

The invention will now be described with reference to the following examples.

EXAMPLE 1

In this example sheets of continuous carbon fibre reinforced polyetheretherketone (PEEK), a high performance polymer obtainable from Imperial Chemical Industries PLC and having the repeat unit:

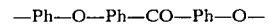
—Ph—O—Ph—CO—Ph—O— where Ph is a phenylene unit, was used. The experiments were conducted on rectangular sheets of carbon fibre reinforced PEEK having a thickness of 1 mm, and having a length and width of approximately 10 cm. The sheets were made up of consolidated superimposed layers of impregnated, aligned, continuous carbon fibres, the layers having been laid up so that the carbon fibres are disposed successively in directions at 0°, 45°, 90° and −45° to a longitudinal direction of the sheet. A Saab 'Fluid Form' hydroforming apparatus was used to press the samples with a brass foil interposed between the rubber diaphragm of the press and the sheet workpiece. The temperature of the brass foil was varied by preheating it to a desired temperature in an oven before assembly in the press. A stainless steel foil 0.25 mm thick was placed over the lower platen of the hydroforming press so that the workpiece was situated between the brass foil and the stainless steel foil. The sheets were heated in an infrared oven until a sheet temperature of about 400° C. was reached.

The process of transferring the heated reinforced sheet to the press, inserting the metal foil and closing the press took, on average, 9 seconds. The workpiece was then held under pressure for a further 10 seconds before pressure was released.

A series of experiments were carried out in which the following variables were evaluated:
 (1) thickness of foil,
 (2) temperature of foil before pressing,
 (3) hydroforming pressure.

The surface quality of the samples below are tabulated below. In the table the following designations are used:
GR glossy, but uneven, ridged surface,
VG very glossy,
S smooth, dull gloss surface,
SD mainly smooth, dull gloss surface, but occasional dry patch with fibres exposed at the surface,
SL mainly smooth, dull gloss surface, but more dry patches than SD,
SU smooth, but unacceptable level of dry patches.

TABLE 1

| Temperature of brass foil (°C.) | Hydrostatic pressure (bar) | Surface quality at a given foil thickness (mm) | | | | | | | | |
|---|---|---|---|---|---|---|---|---|---|---|
| | | 0.025 | 0.05 | 0.0625 | 0.0875 | 0.125 | 0.175 | 0.25 | 0.50 | 1.2 |
| 20 | 20 | GR | GR | VG | VG | S | S | SD | SL | SU |
| 20 | 60 | GR | GR | VG | VG | — | S | SD | SL | SU |
| 20 | 200 | GR | GR | VG | S | — | S | SD | SL | SU |
| 20 | 600 | GR | GR | — | S | S | S | SD | SL | SU |
| 20 | 1000 | — | — | — | — | — | — | SD | SD | |
| 100 | 20 | | | | | | | | SD | SL |
| 100 | 60 | | | | | | | | SD | |
| 100 | 200 | | | | | | | | SD | |
| 100 | 600 | | | | S | S | | S | | SD |
| 150 | 20 | | | | | | | | | |

In control runs in which the metal foil was not used, that is, a standard hydroforming process was used, the samples produced were less satisfactory showing evidence in most cases of surface undulation and scuffing, with some fibres being noticeably proud of the surface.

The results above indicate the benefit of the process of the invention and, in particular, show that significant improvements can be obtained by moderate increases in hydrostatic pressure and pre-heat temperature of the metal foil.

EXAMPLE 2

Similar results were obtained using an aluminium alloy foil using thicknesses ranging from 0.025 mm to 0.5 mm.

EXAMPLE 3

A sheet of carbon fibre reinforced polyetheretherketone as used in Example 1 but having dimensions of 75cm×37.5cm was formed into a double curvature leading edge having a paraboloid section using superplastically deformable aluminium alloy as a resilient diaphragm for transmitting pressure. Superplastic aluminium alloys are described in British Pat. Nos. 1 387 586 and 1 445 181. The following procedure was used. The reinforced sheet was placed together with an aluminium foil of thickness 0.25 mm between two sheets of 'Supral' superplastic aluminium alloy, the edges of the alloy sheets extending beyond the edges of the reinforced sheet so that the alloy sheets can be clamped in a forming tool around their edges without constraining the reinforced sheet. The sandwich was heated in an oven to 400° C. and then clamped in a moulding tool having a female mould with the aluminium foil positioned so that it lies above the reinforced sheet with respect to the female mould. Air pressure is then applied to deform the sandwich against the female mould surface. On cooling the shaping was found to have a very glossy surface. The level of gloss was considerably higher than when the experiment was conducted without the aluminium foil.

We claim:

1. A method of improving the surface finish of a fibre-reinforced thermoplastic article in which the fibres are present as superimposed layers of continuous, aligned fibres comprising pressing the layers at a temperature above the softening point of the thermoplastic of the article characterised in that the pressure is transmitted to the superimposed layers through a resilient member and that a metal foil having a thickness of between 0.05 and 0.5 mm is present between the resilient member and the reinforced article to be pressed, said metal foil being a smoothing means enabling the smoothing of the surface of said thermoplastic article contacting said metal foil and said foil not being a permanent part of said thermoplastic article.

2. A method according to claim 1 wherein the thickness of the metal foil is between 0.075 mm and 0.25 mm.

3. A method according to either of claims 1 and 2 wherein the pressure transmitted to the superimposed layers is between 10 and 200 bar.

4. A method according to claims 1 or 2, wherein the pressure transmitted to the superimposed layers is between 10 and 200 bar; and in which the resilient member is a rubber diaphragm.

5. A method according to claims 1 or 2, wherein the pressure transmitted to the superimposed layers is between 10 and 200 bar; and in which the resilient member is a metal which is plastically deformable at the softening point of the thermpolastic.

6. A method according to claims 1 or 2, wherein the pressure transmitted to the superimposed layers is between 10 and 200 bar; in which the resilient member is a metal which is plastically deformable at the softening point of the thermoplastic; and in which the layers comprise interwoven strips of thermoplastic impregnated, continuous, aligned fibers.

7. A method according to claims 1 or 2, wherein the pressure transmitted to the superimposed layers is between 10 and 200 bar; in which the resilient member is a rubber diaphragm; and in which the layers comprise interwoven strips of thermoplastic impregnated, continuous, aligned fibers.

8. A method according to claim 1 or 2, wherein the pressure transmitted to the superimposed layers is between 10 and 200 bar; in which the resilient member is a rubber diaphragm; in which the layers comprise interwoven strips of thermpolastic impregnated, continuous, aligned fibres; and in which the thermoplastic is an aromatic polymer.

9. A method according to claim 1, further including the step of removing said metal foil from said thermoplastic article.

* * * * *